United States Patent [19]
Wakabayashi et al.

[11] Patent Number: 5,498,848
[45] Date of Patent: Mar. 12, 1996

[54] METHOD AND APPARATUS FOR ELECTRIC DISCHARGE MACHINING

[75] Inventors: Kimihiro Wakabayashi; Noriyuki Nebashi, both of Ebina, Japan

[73] Assignee: Fuji Xerox Co., Ltd., Tokyo, Japan

[21] Appl. No.: 218,845

[22] Filed: Mar. 28, 1994

Related U.S. Application Data

[63] Continuation of Ser. No. 827,218, Jan. 30, 1992, abandoned.

[30] Foreign Application Priority Data

Jan. 31, 1991 [JP] Japan ................................. 3-031688

[51] Int. Cl.$^6$ ................................................. B23H 1/00
[52] U.S. Cl. ................................................. 219/69.17
[58] Field of Search ........................... 219/69.15, 69.17, 219/69.13, 69.11; 501/88

[56] References Cited

U.S. PATENT DOCUMENTS

| | | | |
|---|---|---|---|
| 3,558,843 | 1/1971 | O'Connor | 219/69.15 |
| 4,596,066 | 6/1986 | Inoue | 219/69.15 |
| 4,625,085 | 11/1986 | Yoshida et al. | 219/69.15 |
| 4,753,903 | 6/1988 | Saito | 501/88 |
| 4,771,157 | 9/1988 | Sato et al. | 219/69.15 |
| 4,847,463 | 7/1989 | Levy et al. | 219/69.17 |
| 4,900,890 | 2/1990 | Masaki et al. | 219/69.17 |

FOREIGN PATENT DOCUMENTS

| | | | |
|---|---|---|---|
| 62-157729 | 7/1987 | Japan | 219/69.11 |
| 62-203717 | 9/1987 | Japan | . |
| 63-127816 | 5/1988 | Japan | 219/69.16 |
| 63-229225 | 9/1988 | Japan | . |
| 2-36016 | 2/1990 | Japan | 219/69.13 |

OTHER PUBLICATIONS

"Choice of EDM Tooling, Part II", by Carter et al., EDM Digest, vol. 3, No. 2, Apr. 1981, pp. 18–21, 24.

"Study on Micro–Hole Drilling by EDM" by Masuzawa et al., Bulletin of Japan Society of Precision Engg., vol. 20, No. 2, Jun. 1986, pp. 117–120.

*Primary Examiner*—Geoffrey S. Evans
*Attorney, Agent, or Firm*—Finnegan, Henderson, Farabow, Garrett & Dunner

[57] ABSTRACT

A method and apparatus for micro-electric discharge machining that machines electrically resistant materials having high volume resistivity, such as Mn—Zn ferrite or single crystal silicon material, with a ciruit including an electrode connected to a positive terminal of a power supply and the workpiece of electrically resistant material is connected to a negative terminal of a power supply. The circuit can include a capacitor having a capacitance less than 5000 pF.

14 Claims, 1 Drawing Sheet

METHOD AND APPARATUS FOR ELECTRIC DISCHARGE MACHINING

This application is a continuation, of application Ser. No. 07/827,218, filed Jan. 30, 1992 now abandoned.

BACKGROUND OF THE INVENTION

The present invention relates to a method and apparatus for machining electrically resistant materials such as Mn—Zn ferrite by means of electric discharge in a dielectric fluid.

Workpieces made of metallic materials such as stainless steel, iron and aluminum have conventionally been worked into small shapes by performing electric discharge machining with a dielectric fluid placed between a discharge machining electrode (made of tungsten or a sintered hard alloy and used as negative electrode) and the workpiece (positive electrode). However, this conventional method has presented considerable difficulty in machining workpieces that are made of electrically resistant materials such as Mn—Zn ferrite. Non-conductive materials such as ceramics are worked electrically by a method generally known as "electrolytic discharge machining" and that is described in a prior art reference such as H. Tsuchiya, "Kikai Gijutsu (Machine Technology)", 32-12 (1984), p. 77. However, the electrolytic discharge machining method presents difficulty in handling since it customarily uses NaOH and other strong alkali fluids as electrolyte. With a view to solving this problem, a method that adopts arc discharge in a neutral salt electrolyte such as $NaNO_3$ or NaCl has been proposed in Japanese Patent Unexamined Publication No. Sho. 63-229225. This method, however, is hardly suitable for practical applications since the consumption of the tool electrode is rapid and the precision of machining is low.

A Mn—Zn ferrite as a hard and brittle material can be worked by a cutting method but the applicability of this method is limited to machining the workpiece to simple shapes such as flat plate and a round bar. Ultrasonic machining can be applied using grain particles and this approach takes advantage of the brittle nature of the Mn—Zn ferrite. However, cracking tends to occur upon contact with the working tool and it has been difficult to machine the workpiece to a solid shape having a plate thickness of less than 0.5 mm. Further, the Mn—Zn ferrite has an intrinsic resistance of about 5 to 10 $\Omega$cm and can hardly be worked by the conventional methods of electric discharge machining. Even if discharge machining proceeds to some extent, cracks will readily develop on account of thermal shock and commercially satisfactory working can hardly be accomplished.

SUMMARY OF THE INVENTION

An object of the present invention is to provide a method and apparatus that can perform electric discharge machining on electrically resistant materials with high efficiency. In particular, the present invention enables electric discharge machining of Mn—Zn ferritic materials which have heretofore been practically not amenable to electric discharge machining and it also insures that such Mn—Zn ferritic materials can be subjected to intricate micro-machining, which is one of the major advantages of electric discharge machining. The term "micro-machining" as used herein means typically the case where electric discharge machining is performed using a discharge electrode of no more than about 1 to 2 mm in diameter.

According to a first aspect, the present invention provides a micro-electric discharge machining apparatus that works on an electrically resistant material by causing electric discharge to the resistant material via a dielectric fluid, the apparatus comprising a power supply of a time-constant circuit type that is equipped with a positive terminal and a negative terminal, an electric discharge machining electrode connected to the positive terminal, and an electric connecting means for providing electric connection between the negative terminal and the electrically resistant material.

According to a second aspect, the present invention provides a method for electric discharge machining that machines a workpiece by causing electric discharge between an electroconductive working electrode and the workpiece via a dielectric fluid, which method is characterized in that the workpiece is made of an electrically resistant material and subjected to electric discharge machining with the electroconductive working electrode being connected to positive polarity whereas the workpiece is connected to negative polarity.

The present invention is particularly suitable for machining Mn—Zn ferrite and provides a method for electric discharge machining that machines a workpiece by causing electric discharge between an electroconductive working electrode and the workpiece via a dielectric fluid, which method is characterized in that the workpiece is made of a Mn—Zn ferrite and subjected to electric discharge machining with the electroconductive working electrode being connected to positive polarity whereas the workpiece is connected to negative polarity.

The workpiece made of an electrically resistant material has an intrinsic volume resistivity of at least about 1 $\Omega$cm. The electroconductive working electrode may be formed of an electrically conductive material such as tungsten (W) or a sintered hard alloy (cemented carbide).

The present invention has been accomplished on the basis of the finding that the working speed of electric discharge machining is not only variable with the volume resistivity of the workpiece but also dependent on the polarity of discharge voltage that is applied between the discharge machining electrode and the workpiece. Stated more specifically, the workpiece made of an electrically resistant material is subjected to electric discharge machining, with the discharge machining electrode being used as a positive electrode whereas the workpiece made of an electrically resistant material is used as a negative electrode. By so doing, the workpiece can be machined with a higher efficiency and, at the same time, the consumption of the working electrode is reduced.

DETAILED DESCRIPTION OF THE INVENTION

Figure 1:
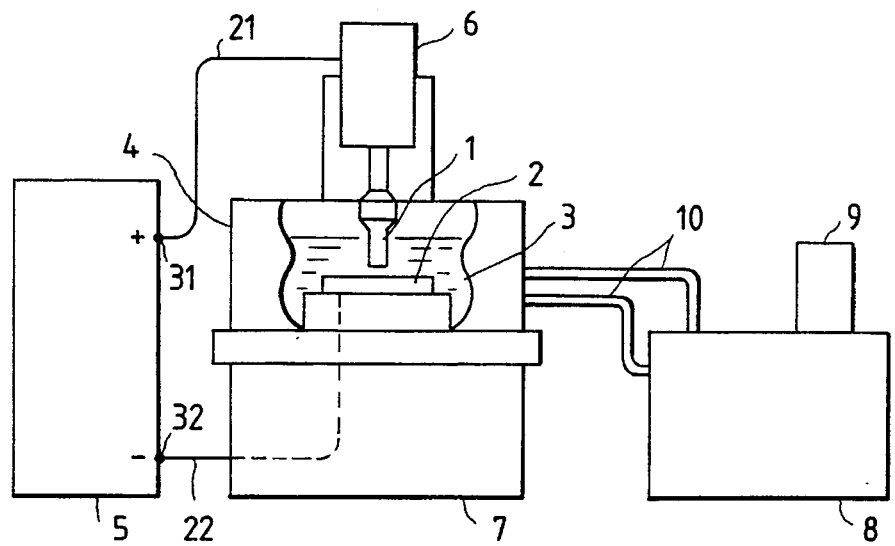
FIG. 1 is a diagram showing schematically an electric discharge machining apparatus of the present invention.
Figure 2:
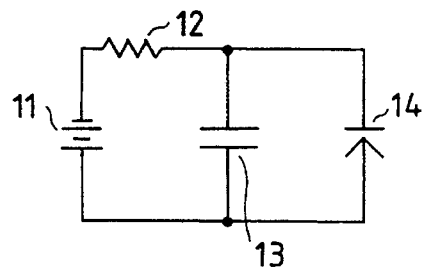
FIG. 2 is a diagram showing schematically a circuit for a stored-energy power supply to be used with the apparatus of the present invention.

FIG. 1 is a diagram showing schematically the apparatus of the present invention. Shown by 1 is a discharge machining electrode made of an electroconductive material, and 2 is a workpiece made of an electrically resistant material. With both of them being immersed in a dielectric working fluid 3 in a working vessel 4, the electrode 1 is connected to a positive terminal 31 of a power supply 5 for electric discharge machining through a lead wire 21 whereas the workpiece 2 is connected to a negative terminal 32 through a lead wire 22, so that electric discharge is caused between the electrode 1 and the workpiece 2 via the dielectric fluid 3 to accomplish electric discharge machining of the workpiece 2. Kerosine and pure water are two typical examples of the dielectric fluid that can be used. The power supply 5 for electric discharge machining may be of a stored-energy type. A circuit for the stored-energy power supply is shown schematically in FIG. 2 and it is a power supply for micro-electric discharge machining that is composed of a power unit 11 and a capacitor circuit comprised of a resistor 12 and a capacitor 13 that are both connected in series to the power unit 11. An electrode pair 14 composed of a discharge electrode and a workpiece electrode is connected in parallel to the capacitor 13. In micro-electric discharge machining, the power supply circuit described above is used to store the discharge energy as electric charge in the capacitor, which is then released and such cycles of storage and release of discharge energy are repeated at high speed. The power supply circuit of this type which causes discharge using a capacitor has the advantage that by reducing the capacity of the capacitor to several hundreds pF, a very small energy for discharge of approximately one microjoule can be obtained more easily than with a power supply circuit that uses a transistor.

Turning back to FIG. 1, the dielectric working fluid 3 passes through pipes 10 to be circulated between the working vessel 4 and a working fluid tank 8 in such a way that any dirt and shavings present in the fluid 3 are removed by means of a filter unit 9 and fed back to the working vessel 4.

Particularly, Mn—Zn ferrite materials having volume resistivities of about 5 to 10 $\Omega$cm can be subjected to effective electric discharge machining over a discharge energy range of about 1 to 100 µJ. Consider, for example, the case where a voltage of 100 V is applied to a power supply circuit using a capacitor having a capacity of 5000 pF; electric discharge machining can be accomplished with an energy for discharge that is not greater than about 25 µJ. To implement the present invention, the working electrode 1 made of an electroconductive material is connected to the positive terminal of the power supply of the type described above whereas the workpiece 2 made of an electrically resistant material or Mn—Zn ferrite is connected to the negative terminal, so that electric discharge is caused via the dielectric working fluid 3 to accomplish electric discharge machining of the workpiece 2.

In electric discharge machining, the working electrode is positioned to face the workpiece and by applying a voltage higher than the dielectric breakdown voltage of the working fluid with the distance between the electrode and the workpiece being adequately reduced, electric discharge can be caused. The heat generated by the discharge will melt the surface of the workpiece in areas near the point of discharge and, at the same time, the dielectric working fluid present around the discharge path is evaporated explosively. The air bubbles produced by this evaporation are subjected to repeated cycles of expansion and contraction and the resulting fluctuations in pressure will cause the shavings of the molten workpiece to be dispersed as fine particles in the fluid. By this single working step, one hole is formed in the surface of the workpiece. Thus, by repeating this procedure of causing electric discharge, the area of the workpiece that faces the working electrode can be machined over the entire surface. Therefore, a pulsed voltage need be applied as a working voltage for electric discharge machining. In ordinary electric discharge machining, a switching circuit incorporating a transistor and other elements is used. On the other hand, in micro-electric discharge machining which is to accomplish working to a fine size ranging from dozens of micrometers to approximately two hundred micrometers, pulses of an extremely narrow width are required in order to reduce the energy for discharge. However, such a small pulse width is difficult to obtain by switching with the transistor-based circuit. Under these circumstances, a capacitor circuit is used in microelectric discharge machining. Pulses having a width of about 50 ns to 1 ns can be obtained with a capacitor circuit. It should be noted here that in electric discharge machining, not only the workpiece is machined, but also at the same time the working electrode is damaged; therefore, it is necessary to select such a polarity and material that less damage will be caused to the working electrode. In ordinary electric discharge machining, the operating principle is based on the ion and electron flow caused by the generation of a plasma, so that the polarity which causes less damage to the working electrode depends on the combination of working electrode material and workpiece material. However, in micro-electric discharge machining, the operating principle is based solely upon the flow of electrons, so the consumption of the working electrode is smaller when it is connected to the negative terminal irrespective of the material of which the electrode is made. In this connection, it should be particularly mentioned that the present inventors found that in the case of working electrically resistant materials having volume resistivity of about 5 to 30 $\Omega$cm, in particular, a Mn—Zn based ferrite, by micro-electric discharge machining, the efficiency of working the workpiece could be enhanced while the consumption of the working electrode was reduced by connecting the working electrode to the positive terminal, rather than the negative terminal, of the power supply. The term "Mn—Zn based ferrite" as used herein means the ferrite that is represented by the compositional formula $(MnZnFe)Fe_2O_4$.

The following examples are provided for the purpose of further illustrating the present invention but are in no way to be taken as limiting.

EXAMPLE 1

Using a cylindrical working electrode 1 (see FIG. 1) made of a sintered hard alloy with a diameter of 0.2 mm, a stored-energy power supply 5 and kerosine as a dielectric working fluid 3, a flat workpiece 2 made of Mn—Zn ferrite having a volume resistivity of 10 $\Omega$cm was subjected to electric discharge machining. When the working electrode 1 was connected to positive polarity and the workpiece 2 to negative polarity, with the working voltage 110 V from the power supply 5, the capacity 3300 pF of the capacitor in the power supply circuit and the rotational speed 3500 rpm of the working electrode 1, holes were formed in the workpiece 2 at a working speed of 2 µm/sec. The side walls of the holes were very smooth and no cracks were observed. Highly precise machining could be continuously performed with little consumption of the working electrode.

A comparative run was made under identical conditions except that the polarity of the working voltage was reversed. In that case (i.e., the working electrode was connected to negative polarity and the workpiece to positive polarity), the workpiece could hardly be worked by electric discharge machining.

EXAMPLE 2

Using an electric discharge machining apparatus of the same type as used in Example 1, a flat workpiece 2 made of single-crystal silicon having a volume resistivity of about 1 Ωcm was subjected to electric discharge machining. When the working electrode 1 was connected to positive polarity and the workpiece 2 to negative polarity, with the working voltage 110 V from the power supply 5 of a stored-energy type, the capacity 3300 pF of the capacitor in the power supply circuit and the rotational speed 3500 rpm of the working electrode 1, holes were formed in the workpiece 2 at a working speed of about 1.8 μm/sec. Unlike the case of working the Mn—Zn ferrite, the working electrode was consumed by about 0.5 vol % of the amount in which the workpiece was machined.

A comparative run was made under identical conditions except that the polarity of the working voltage was reversed. In that case (i.e., the working electrode was connected to negative polarity and the workpiece to positive polarity), the working speed dropped by about 25% compared to the case of connecting the workpiece to negative polarity. Further, the working electrode was consumed by about 5 vol% of the amount in which the workpiece was machined, indicating that the electrode consumption was about 10 times as great as that which occurred in the case of connecting the workpiece to negative polarity. It was therefore evident that electric discharge machining with the working electrode being connected to positive polarity and the workpiece to negative polarity achieved a higher efficiency than when the polarity of electric connection was reversed.

Comparative Example 1

Using an electric discharge machining apparatus of the same type as used in Example 1, a flat workpiece 2 made of a SiC ceramic material having a volume resistivity of about $2.8 \times 10^{-2}$ Ωcm was subjected to electric discharge machining. When the working electrode 1 was connected to positive polarity and the workpiece 2 to negative polarity, with the working voltage 110 V from the power supply 5 of a stored-energy type, the capacity 3300 pF of the capacitor in the power supply circuit and the rotational speed 3500 rpm of the working electrode 1, holes were formed in the workpiece 2 at a working speed of about 0.9 μm/sec. The resulting consumption of the working electrode was about 30 vol% of the amount in which the workpiece was machined.

A comparative run was made under identical conditions except that the polarity of the working voltage was reversed. In that case (i.e., the working electrode was connected to negative polarity and the workpiece to positive polarity), the working speed increased by about 10% compared to the case of connecting the workpiece to negative polarity. Further, the working electrode was consumed by about 8 vol% of the amount in which the workpiece was machined, indicating that the electrode consumption dropped to about one-fourth of the amount that occurred in the case of connecting the workpiece to negative polarity. It can therefore be said that although there was no significant difference in the performance of electric discharge machining between the cases where the working electrode and the workpiece were respectively connected to negative and positive polarity and vice versa, the efficiency of machining was a bit higher in the former case.

Comparative Example 2

Using an electric discharge machining apparatus of the same type as used in Example 1, a flat workpiece 2 made of a TiCN ceramic material having a volume resistivity of about $3.4 \times 10^{-5}$ Ωcm was subjected to electric discharge machining. When the working electrode 1 was connected to positive polarity and the workpiece to negative polarity, with the working voltage 110 V from the power supply 5 of a stored-energy type, the capacity 3300 pF of the capacitor in the power supply circuit and the rotational speed 3500 rpm of the working electrode 1, holes were formed in the workpiece 2 at a working speed of about 0.7 μm/sec. The resulting consumption of the working electrode was about 150 vol% of the amount in which the workpiece was machined.

A comparative run was made under identical conditions except that the polarity of the working voltage was reversed. In that case (i.e., the working electrode was connected to negative polarity and the workpiece to positive polarity), the working speed increased by about 50% compared to the case of connecting the workpiece to negative polarity. Further, the working electrode was consumed by about 10 vol% of the amount in which the workpiece was machined, indicating that the electrode consumption dropped to about 1/15 of the amount that occurred in the case of connecting the workpiece to negative polarity. Therefore, electric discharge machining with the working electrode being connected to negative polarity and the workpiece to positive polarity achieved a higher efficiency than when the polarity of electric connection was reversed.

Figure 3:
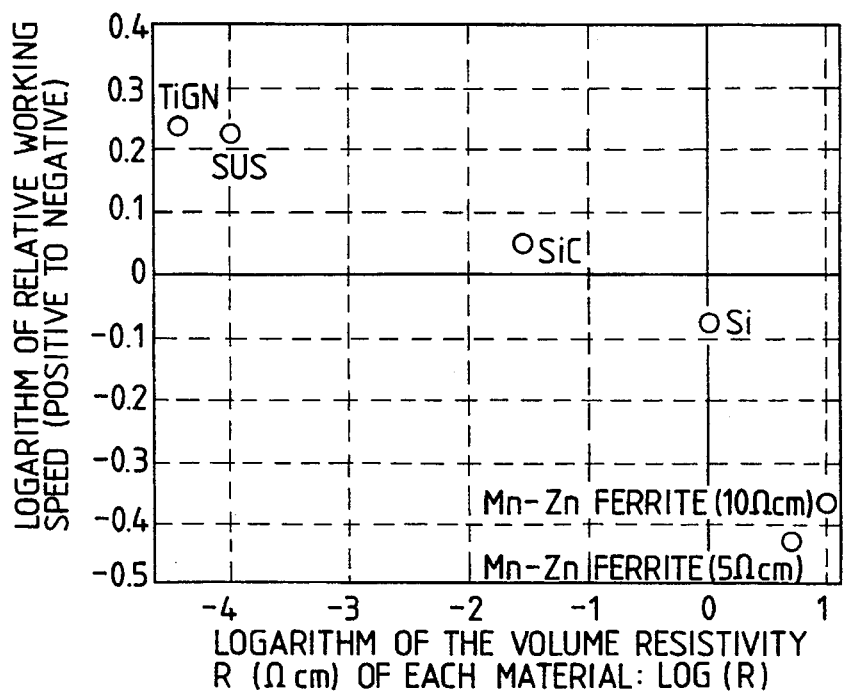
FIG. 3 is a graph showing data on the workability of various materials by the electric discharge machining method of the present invention.

The results of Examples 1 and 2 as well as Comparative Examples 1 and 2 are shown graphically in FIG. 3. The vertical axis of the graph in FIG. 3 plots the logarithm of the relative working speed for each material depending on the polarity of discharge voltage. Stated more specifically, the vertical axis plots the logarithm of the ratio of the working speed for the case where the workpiece is connected to positive polarity to the working speed for the case where the same workpiece is connected to negative polarity, as expressed by the following formula:

Log (working speed when the workpiece is connected to positive polarity/working speed when the workpiece is connected to negative polarity)

The horizontal axis of the graph in FIG. 3 plots the volume resistivity of each workpiece material on the logarithmic scale. According to FIG. 3, one can see that for electrically resistant materials having a volume resistivity equal to or higher than 10° Ωcm, the polarity of electric discharge machining is opposite to the case of electroconductive workpiece materials.

FIG. 3 also illustrates the results of machining Mn—Zn ferrite having a volume resistivity of 5 Ωcm and stainless steel (SUS 304) having a volume resistivity of about $1.0 \times 10^{-4}$ Ωcm. The machining apparatus used was of the same type as in Example 1 and explanation of its details is omitted.

It is also apparent from FIG. 3 that even Mn—Zn ferrite having a volume resistivity of about 5 to 10 Ωcm could successfully be worked by electric discharge machining with the workpiece being connected to negative polarity.

In accordance with the present invention, even a workpiece that is made of an electrically resistant material can be subjected to highly precise micromachining with small consumption of the discharge electrode. A further advantage of the present invention is that it also enables highly precise micromachining of Mn—Zn ferritic materials which have heretofore been practically not amenable to electric discharge machining by the conventional methods.

What is claimed is:

1. In a method for electric discharge machining that machines a workpiece by causing electric discharge between an electroconductive working electrode and said workpiece via a dielectric fluid, the improvement wherein said workpiece is composed of a material selected from the group consisting of a magnesium-zinc-based ferrite material, a single crystal silicon material, and a material having a volume resistivity equal to or higher than 10 Ωcm and subjected to electric discharge machining with said electroconductive working electrode being connected to positive polarity whereas said workpiece is connected to negative polarity.

2. A method according to claim 1, wherein an electric discharge is caused by a time-constant voltage.

3. A method according to claim 1, wherein said electrically resistant material is composed of a single crystal silicon material.

4. A method according to claim 1, wherein said electrically resistant material workpiece has a volume resistivity greater than 10 Ωcm.

5. In a method for electric discharge machining that machines a workpiece by causing electric discharge between an electroconductive working electrode and said workpiece via a dielectric fluid, the improvement wherein said workpiece is made of a Mn—Zn ferrite and subjected to electric discharge machining with said electroconductive working electrode being connected to positive polarity whereas said workpiece is connected to negative polarity.

6. A method according to claim 5, wherein an electric discharge is caused by a time-constant voltage.

7. A method according to claim 5, wherein a volume resistivity of said Mn—Zn ferrite is at least about 5 Ωcm.

8. A method of discharge machining a workpiece, comprising the steps of:

arranging a working electrode to face the workpiece composed of a magnesium-zinc based ferrite material having a volume resistivity between about 5 to 30 ohm-centimeter;

arranging a dielectric fluid between the magnesium-zinc based ferrite material and the working electrode;

coupling the working electrode to a positive terminal of a power supply;

coupling the magnesium-zinc based ferrite material to a negative terminal of the power supply; and discharging electrical energy through the dielectric fluid between the magnesium-zinc based ferrite material and the working electrode.

9. A method of discharge machining a workpiece according to claim 8, further comprising the steps of:

shaping the workpiece to a form having a flat surface; and shaping the working electrode to a cylindrical form having ends, the cylindrical form having a diameter of less than about 2 millimeters;

wherein the step of arranging the working electrode to face the workpiece includes the substep of arranging any one end of the working electrode to face the flat surface of the workpiece; and wherein the electrical energy of the discharging step is between about 1 to 100 microJoule.

10. In combination, a micro-electric discharge machining apparatus and an electrically resistant material workpiece that is composed of a material selected from the group consisting of a magnesium-zinc-based ferrite material, a single crystal silicon material and a material having a volume resistivity equal to or higher than 10 Ωcm, said apparatus comprising:

a power supply of a time-constant circuit type that is equipped with a positive terminal and a negative terminal;

an electric discharge machining electrode connected to said positive terminal; and an electric connecting means for providing electric connection between said negative terminal and said electrically resistant material workpiece.

11. The combination of claim 10, wherein said discharge machining electrode has a diameter less than about 2 mm and said power supply includes a capacitor having a capacitance of less than about 5000 pF.

12. The combination of claim 10, wherein said electrically resistant material workpiece is composed of a magnesium-zinc based ferrite material.

13. The combination of claim 10, wherein said electrically resistant material workpiece is composed of a single crystal silicon material.

14. The combination of claim 10, wherein said electrically resistant material workpiece has a volume resistivity greater than 10 Ωcm.

\* \* \* \* \*